United States Patent
Shimizu et al.

(10) Patent No.: US 11,901,568 B2
(45) Date of Patent: Feb. 13, 2024

(54) ELECTROCATALYST

(71) Applicants: Ryo Shimizu, Toyota (JP); Kumiko Nomura, Toyota (JP); Tomohiro Takeshita, Nagakute (JP); Shu Miyasaka, Kakegawa (JP); Kenji Yamamoto, Kakegawa (JP)

(72) Inventors: Ryo Shimizu, Susono (JP); Kumiko Nomura, Okazaki (JP); Tomohiro Takeshita, Nagakute (JP); Shu Miyasaka, Hamamatsu (JP); Kenji Yamamoto, Hamamatsu (JP)

(73) Assignees: TOYOTA JIDOSHA KABUSHIKI KAISHA, Toyota (JP); CATALER CORPORATION, Kakegawa (JP)

(*) Notice: Subject to any disclaimer, the term of this patent is extended or adjusted under 35 U.S.C. 154(b) by 0 days.

(21) Appl. No.: 17/653,400

(22) Filed: Mar. 3, 2022

(65) Prior Publication Data
US 2022/0285697 A1 Sep. 8, 2022

(30) Foreign Application Priority Data

Mar. 4, 2021 (JP) ................................. 2021-034278

(51) Int. Cl.
*H01M 4/00* (2006.01)
*H01M 4/92* (2006.01)
(Continued)

(52) U.S. Cl.
CPC ......... *H01M 4/926* (2013.01); *H01M 4/8842* (2013.01); *C22C 5/04* (2013.01)

(58) Field of Classification Search
CPC .. H01M 4/926; H01M 4/8817; H01M 4/8807; H01M 4/8882; H01M 4/8842; H01M 2008/1095; Y02E 60/50
See application file for complete search history.

(56) References Cited

U.S. PATENT DOCUMENTS

| 2016/0072134 A1 | 3/2016 | Ohma et al. |
| 2017/0338495 A1 | 11/2017 | Horiuchi et al. |
| 2019/0336956 A1 | 11/2019 | Suzue et al. |

FOREIGN PATENT DOCUMENTS

| CN | 106605325 A | 4/2017 |
| JP | 2017212217 A | 11/2017 |

(Continued)

OTHER PUBLICATIONS

Mizutani et al, Electrode Catalyst for Fuel Cell, Method of Producing the Same, and Fuel Cell, 2018, See the Abstract (Year: 2018).*

*Primary Examiner* — Cynthia H Kelly
*Assistant Examiner* — Monique M Wills
(74) *Attorney, Agent, or Firm* — Dickinson Wright, PLLC

(57) ABSTRACT

To provide an electrocatalyst for fuel cells, which is configured to ensure both the initial performance and durability of fuel cells. An electrocatalyst for fuel cells, wherein the electrocatalyst comprises a carbon support including a mesopore and a catalyst alloy supported on the carbon support, and the catalyst alloy is a catalyst alloy of platinum and a transition metal; wherein the mesopore includes at least one throat; wherein an average effective diameter of the at least one throat is 1.8 nm or more and less than 3.2 nm; and wherein a transition metal ratio of the catalyst alloy supported on a deeper-side region than the at least one throat, is lower than the transition metal ratio of the catalyst alloy supported on a nearer-side region than the at least one throat.

5 Claims, 2 Drawing Sheets

(51) Int. Cl.
*H01M 4/88* (2006.01)
*C22C 5/04* (2006.01)

(56) References Cited

FOREIGN PATENT DOCUMENTS

WO     2017183475 A1   10/2017
WO   WO-2018104775 A2 *  6/2018  ............. H01M 4/88

* cited by examiner

ELECTROCATALYST

TECHNICAL FIELD

The disclosed embodiments relate to an electrocatalyst.

BACKGROUND

A fuel cell (FC) is a power generation device that generates electrical energy by electrochemical reaction between fuel gas (e.g., hydrogen) and oxidant gas (e.g., oxygen) in a single unit fuel cell or a fuel cell stack (hereinafter, it may be simply referred to as "stack") composed of stacked unit fuel cells (hereinafter may be referred to as "cell")). In many cases, the fuel gas and oxidant gas actually supplied to the fuel cell are mixtures with gases that do not contribute to oxidation and reduction. Especially, the oxidant gas is often air containing oxygen.

Hereinafter, fuel gas and oxidant gas may be collectively and simply referred to as "reaction gas" or a "gas". Also, a single unit fuel cell and a fuel cell stack composed of stacked unit fuel cells may be collectively referred to as "fuel cell".

In general, the unit fuel cell includes a membrane-electrode assembly (MEA).

The membrane electrode assembly has a structure such that a catalyst layer and a gas diffusion layer (or GDL, hereinafter it may be simply referred to as "diffusion layer") are sequentially formed on both surfaces of a solid polymer electrolyte membrane (hereinafter, it may be simply referred to as "electrolyte membrane"). Accordingly, the membrane electrode assembly may be referred to as "membrane electrode gas diffusion layer assembly" (MEGA).

As needed, the unit fuel cell includes two separators sandwiching both sides of the membrane electrode gas diffusion layer assembly. In general, the separators have a structure such that a groove is formed as a reaction gas flow path on a surface in contact with the gas diffusion layer. The separators have electronic conductivity and function as a collector of generated electricity.

In the fuel electrode (anode) of the fuel cell, hydrogen ($H_2$) as the fuel gas supplied from the gas flow path and the gas diffusion layer, is protonated by the catalytic action of the catalyst layer, and the protonated hydrogen goes to the oxidant electrode (cathode) through the electrolyte membrane. An electron is generated at the same time, and it passes through an external circuit, does work, and then goes to the cathode. Oxygen ($O_2$) as the oxidant gas supplied to the cathode reacts with protons and electrons in the catalytic layer of the cathode, thereby generating water. The generated water gives appropriate humidity to the electrolyte membrane, and excess water penetrates the gas diffusion layer and then is discharged to the outside of the system.

Various studies have been made on electrodes used in fuel cells.

For example, Patent Literature 1 discloses an electrocatalyst in which alloy microparticles of platinum and a metal component other than platinum, are supported inside a mesopore and in which the molar content ratio of the platinum with respect to the metal component other than platinum in the alloy microparticles supported in the mesopore, is from 1.0 to 10.0.

Patent Literature 2 discloses a catalyst comprising a catalyst support and a catalyst metal supported on the catalyst support, in which the catalyst support includes a pore having a radius of less than 1 nm and a pore having a radium of 1 nm or more, in which the surface area formed by the pore having a radius of less than 1 nm is equal to or larger than the surface area formed by the pore having a radius of 1 nm or more, and in which the average particle diameter of the catalyst metal is 2.8 nm or more.

Patent Literature 1: International Publication No. WO2017/183475

Patent Literature 2: Japanese Patent Application Laid-Open (JP-A) No. 2017-212217

Platinum (Pt), which is a catalytically active species, has low activity by itself, and the activity can be increased by alloying with a transition metal. However, the transition metal used for alloying as typified by Co and Ni, is likely to be ionized and dissolved under fuel cell operation, and this remarkably occurs in a catalyst containing large amounts of the transition metal. In the case of using the catalyst in a fuel cell, the fuel cell cannot keep its initial performance, and the durability of the fuel cell is low. Accordingly, it is needed to establish a technique to ensure both the initial performance and durability of the fuel cell.

In general, the initial performance of the fuel cell is high when the ratio of Pt to the transition metal in the catalyst is 3:1. The initial performance of the fuel cell is low even when the ratio of Pt to the transition metal is higher or lower than 3:1. Meanwhile, the durability of the fuel cell is high when the ratio of Pt to the transition metal is lower than 3:1. At the Pt to Co ratio of the catalyst of Patent Literature 1, while the durability of the fuel cell is high, the initial performance is low. In the prior art, only the alloy with a single ratio is used as the catalyst. Accordingly, any one of the initial performance and durability of the fuel cell can be satisfied. However, it is difficult to ensure both the initial performance and durability of the fuel cell.

There is a tendency such that from the catalyst in which the ratio of the transition metal is high, the transition metal is likely to desorb compared to the catalyst in which the ratio of the transition metal is low, and the progress of the dissolution of the transition metal is remarkable.

SUMMARY

The disclosed embodiments were achieved in light of the above circumstances. An object of the disclosed embodiments is to provide an electrocatalyst for fuel cells, which is configured to ensure both the initial performance and durability of fuel cells.

In a first embodiment, there is provided an electrocatalyst for fuel cells,
wherein the electrocatalyst comprises a carbon support including a mesopore and a catalyst alloy supported on the carbon support, and the catalyst alloy is a catalyst alloy of platinum and a transition metal;
wherein the mesopore includes at least one throat;
wherein an average effective diameter of the at least one throat is 1.8 nm or more and less than 3.2 nm; and
wherein a transition metal ratio of the catalyst alloy supported on a deeper-side region than the at least one throat, is lower than the transition metal ratio of the catalyst alloy supported on a nearer-side region than the at least one throat.

The average effective diameter of the mesopore is 3.2 nm or more and 3.8 nm or less.

The average effective diameter of the at least one throat may be 1.8 nm or more and 2.1 nm or less.

The transition metal may be at least one selected from the group consisting of cobalt and nickel.

The fuel cell of the disclosed embodiments is a fuel cell comprising a catalyst layer comprising the electrocatalyst.

According to the electrocatalyst of the disclosed embodiments, both the initial performance and durability of fuel cells can be ensured.

BRIEF DESCRIPTION OF THE DRAWINGS

In the accompanying drawings.

DETAILED DESCRIPTION

Figure 1:
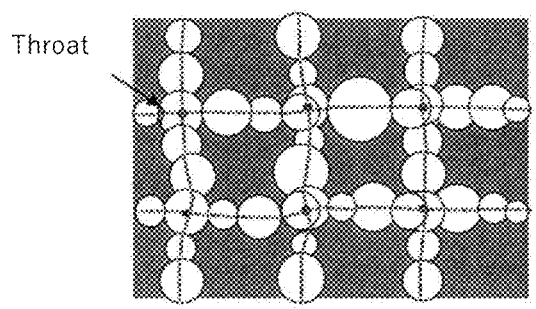
FIG. 1 is a schematic sectional view of an example of the carbon support including the mesopore used in the disclosed embodiments.

The electrocatalyst of the disclosed embodiments is an electrocatalyst for fuel cells, wherein the electrocatalyst comprises a carbon support including a mesopore and a catalyst alloy supported on the carbon support, and the catalyst alloy is a catalyst alloy of platinum and a transition metal;

wherein the mesopore includes at least one throat;

wherein an average effective diameter of the at least one throat is 1.8 nm or more and less than 3.2 nm; and wherein a transition metal ratio of the catalyst alloy supported on a deeper-side region than the at least one throat, is lower than the transition metal ratio of the catalyst alloy supported on a nearer-side region than the at least one throat.

According to the disclosed embodiments, the alloy with a relatively high transition metal ratio (the alloy from which the transition metal is likely to desorb) is supported more outside (nearer side) than the at least one throat of the mesopore of the support, and the alloy with a relatively low transition metal ratio (the alloy from which the transition metal is less likely to desorb) is supported more inside (deeper side) than the at least one throat of the mesopore of the support.

That is, the ratio of the transition metal contained in the alloy that is the catalyst, is low in the part more inside than the at least one throat of the mesopore of the support, and it is high in the part more outside (nearer side) than the at least one throat of the mesopore of the support.

Accordingly, in the durability test of the fuel cell, the transition metal can be preferentially desorbed (or partly sacrificed) from the alloy supported on the nearer side. As a result, the ratio of the transition metal in the alloy from which the transition metal has desorbed after the durability test of the fuel cell, can be controlled to a ratio at which the initial performance of the fuel cell is high. In the meantime, the durability of the fuel cell is ensured, since the transition metal is less likely to desorb from the alloy that is supported more inside (deeper side) than the at least one throat of the mesopore of the support. Accordingly, the initial high performance of the fuel cell can be ensured more outside (nearer side) than the at least one throat of the mesopore of the support, and the post-durability test performance of the fuel cell can be ensured more inside (deeper side) than the at least one throat of the mesopore of the support.

The electrocatalyst comprises the carbon support and the catalyst alloy.

The carbon support supports the catalyst alloy.

The carbon support includes the mesopore. The average effective diameter of the mesopore is not particularly limited, as long as it is larger than the average effective diameter of the at least one throat. The average effective diameter of the mesopore may be 3.2 nm or more and 3.8 nm or less.

The mesopore includes the at least one throat.

The average effective diameter of the at least one throat is smaller than the average effective diameter of the mesopore. The average effective diameter of the at least one throat is 1.8 nm or more and less than 3.2 nm. The average effective diameter of the at least one throat may be 1.8 nm or more and 2.1 nm or less.

The carbon support may be in a particulate form. That is, the carbon support may be carbon support particles.

The particle diameter of the carbon support particles is not particularly limited, as long as it is larger than the average effective diameter of the mesopore. For example, the particle diameter of the carbon support particles may be more than 3.8 nm and 100 nm or less.

The average effective diameter of the mesopore, the average effective diameter of the at least one throat, and the particle diameter of the carbon support particles may be measured by 3D-TEM or the like. The average effective diameter means a diameter measured by taking a 3D-TEM image of the mesopore or the at least one throat and considering the mesopore or the at least one throat shown in the 3D-TEM image as a circle.

The porosity of the carbon support may be from 33% to 39%, for example.

The carbon support may be acetylene black or the like. As the carbon support, a commercially-available product may be used.

FIG. 1 is a schematic sectional view of an example of the carbon support including the mesopore used in the disclosed embodiments. As shown in FIG. 1, the mesopore includes the at least one throat.

The catalyst alloy is supported on the carbon support.

The catalyst alloy is an alloy of platinum and a transition metal.

The transition metal may be at least one selected from the group consisting of cobalt and nickel.

The ratio of the platinum to transition metal in the catalyst alloy may be a molar ratio between 4:1 and 11:1.

The transition metal ratio of the catalyst alloy supported on the deeper-side region than the at least one throat, is lower than the transition metal ratio of the catalyst alloy supported on the nearer-side region than the at least one throat.

The catalyst alloy may be in a particulate form. That is, the catalyst alloy may be catalyst alloy particles.

The particle diameter of the catalyst alloy particles (i.e., the catalyst alloy particle diameter) is not particularly limited. It may be 1 nm or more and 10 nm or less. The particle diameter of the catalyst alloy particles may be measured by 3D-TEM or the like.

When the particle diameter of the catalyst alloy particles is equal to or more than the average effective diameter of the mesopore of the carbon support, the catalyst alloy particles may be supported outside the mesopore or on the surface of the carbon support.

When the particle diameter of the catalyst alloy particles is equal to or more than the average effective diameter of the at least one throat of the carbon support and is less than the average effective diameter of the mesopore of the carbon support, the catalyst alloy particles may be supported on the region more outside (nearer side) than the at least one throat of the mesopore of the carbon support.

When the particle diameter of the catalyst alloy particles is less than the average effective diameter of the at least one throat of the carbon support, the catalyst alloy particles may be supported on the region more inside (deeper side) than the at least one throat of the mesopore of the carbon support.

The method for producing the electrocatalyst may include the step of supporting Pt and the transition metal on the carbon support including the mesopore (a supporting step) and the step of alloying the Pt and transition metal supported on the carbon support (an alloying step).

In the supporting step, the Pt and the transition metal are supported on the carbon support at a molar ratio between 4:1 and 11:1, for example.

In the alloying step, the Pt and the transition metal are alloyed at a temperature of from 700° C. to 900° C., for example.

The electrocatalyst of the disclosed embodiments is an electrocatalyst for fuel cells.

An electrode including the electrocatalyst may be used as a cathode, as an anode, or as both a cathode and an anode.

The fuel cell of the disclosed embodiments is a fuel cell comprising the catalyst layer comprising the electrocatalyst.

The catalyst layer may be a cathode catalyst layer, may be an anode catalyst layer, or may be both cathode and anode catalyst layers.

The cathode catalyst layer and the anode catalyst layer are collectively referred to as "catalyst layer".

The fuel cell may be a fuel cell composed of only one unit fuel cell, or it may be a fuel cell stack composed of stacked unit fuel cells.

The number of the stacked unit fuel cells is not particularly limited. For example, 2 to several hundred unit fuel cells may be stacked, or 2 to 200 unit fuel cells may be stacked.

The fuel cell stack may include an end plate at both stacking-direction ends of each unit fuel cell.

Each unit fuel cell includes at least a membrane electrode gas diffusion layer assembly.

The membrane electrode gas diffusion layer assembly includes an anode-side gas diffusion layer, an anode catalyst layer, an electrolyte membrane, a cathode catalyst layer, and a cathode-side gas diffusion layer in this order.

The cathode (oxidant electrode) includes the cathode catalyst layer. As needed, it includes the cathode-side gas diffusion layer.

The anode (fuel electrode) includes the anode catalyst layer. As needed, it includes the anode-side gas diffusion layer.

The cathode-side gas diffusion layer and the anode-side gas diffusion layer are collectively referred to as "gas diffusion layer".

The gas diffusion layer may be a gas-permeable electroconductive member or the like.

As the electroconductive member, examples include, but are not limited to, a porous carbon material such as carbon cloth and carbon paper, and a porous metal material such as metal mesh and foam metal.

The electrolyte membrane may be a solid polymer electrolyte membrane. As the solid polymer electrolyte membrane, examples include, but are not limited to, a hydrocarbon electrolyte membrane and a fluorine electrolyte membrane such as a thin, moisture-containing perfluorosulfonic acid membrane. The electrolyte membrane may be a Nafion membrane (manufactured by DuPont Co., Ltd.), for example.

As needed, each unit fuel cell may include two separators sandwiching both sides of the membrane electrode gas diffusion layer assembly. One of the two separators is an anode-side separator, and the other is a cathode-side separator. In the disclosed embodiments, the anode-side separator and the cathode-side separator are collectively referred to as "separator".

The separator may include supply and discharge holes for allowing the reaction gas and the refrigerant to flow in the stacking direction of the unit fuel cells. As the refrigerant, for example, a mixed solution of ethylene glycol and water may be used to prevent freezing at low temperature.

As the supply hole, examples include, but are not limited to, a fuel gas supply hole, an oxidant gas supply hole, and a refrigerant supply hole.

As the discharge hole, examples include, but are not limited to, a fuel gas discharge hole, an oxidant gas discharge hole, and a refrigerant discharge hole.

The separator may include one or more fuel gas supply holes, one or more oxidant gas supply holes, one or more refrigerant supply holes, one or more fuel gas discharge holes, one or more oxidant gas discharge holes, and one or more refrigerant discharge holes.

The separator may include a reactant gas flow path on a surface in contact with the gas diffusion layer. Also, the separator may include a refrigerant flow path for keeping the temperature of the fuel cell constant on the opposite surface to the surface in contact with the gas diffusion layer.

When the separator is the anode-side separator, it may include one or more fuel gas supply holes, one or more oxidant gas supply holes, one or more refrigerant supply holes, one or more fuel gas discharge holes, one or more oxidant gas discharge holes, and one or more refrigerant discharge holes. The anode-side separator may include a fuel gas flow path for allowing the fuel gas to flow from the fuel gas supply hole to the fuel gas discharge hole, on the surface in contact with the anode-side gas diffusion layer. The anode-side separator may include a refrigerant flow path for allowing the refrigerant to flow from the refrigerant supply hole to the refrigerant discharge hole, on the opposite surface to the surface in contact with the anode-side gas diffusion layer.

When the separator is the cathode-side separator, it may include one or more fuel gas supply holes, one or more oxidant gas supply holes, one or more refrigerant supply holes, one or more fuel gas discharge holes, one or more oxidant gas discharge holes, and one or more refrigerant discharge holes. The cathode-side separator may include an oxidant gas flow path for allowing the oxidant gas to flow from the oxidant gas supply hole to the oxidant gas discharge hole, on the surface in contact with the cathode-side gas diffusion layer. The cathode-side separator may include a refrigerant flow path for allowing the refrigerant to flow from the refrigerant supply hole to the refrigerant discharge hole, on the opposite surface to the surface in contact with the cathode-side gas diffusion layer.

The separator may be a gas-impermeable electroconductive member or the like. As the electroconductive member, examples include, but are not limited to, gas-impermeable dense carbon obtained by carbon densification, and a metal plate (such as an iron plate, and aluminum plate and a stainless-steel plate) obtained by press-molding. The separator may function as a collector.

The fuel cell stack may include a manifold such as an inlet manifold communicating between the supply holes and an outlet manifold communicating between the discharge holes.

As the inlet manifold, examples include, but are not limited to, an anode inlet manifold, a cathode inlet manifold and a refrigerant inlet manifold.

As the outlet manifold, examples include, but are not limited to, an anode outlet manifold, a cathode outlet manifold and a refrigerant outlet manifold.

In the disclosed embodiments, the fuel gas and the oxidant gas are collectively referred to as "reaction gas". The reaction gas supplied to the anode is the fuel gas, and the reaction gas supplied to the cathode is the oxidant gas. The fuel gas is a gas mainly containing hydrogen, and it may be hydrogen. The oxidant gas may be oxygen, air, dry air or the like.

EXAMPLES

Hereinafter, the present disclosure will be described in more detail with reference to examples and comparative examples. The technical scope of the present disclosure is not limited to these examples. The examples and comparative examples are not distinguished based on whether or not they are included in the scope of the claims. Embodiments that obtained excellent results are regarded as examples, and other embodiments are regarded as comparative examples.

Example 1

<Production of Electrocatalyst>
(1) Supporting Step

A dispersion was obtained by dispersing a carbon support including a mesopore (1.0 g, manufactured by Denka Co., Ltd.) in pure water (41.6 mL). A dinitrodiamine platinum nitric acid solution (U.S. Pat. No. 4,315,857, manufactured by Cataler Corporation) containing platinum (1.0 g) was added to the dispersion in a dropwise manner, and the carbon support was sufficiently mixed with the dinitrodiamine platinum nitric acid solution. As a reductant, ethanol (3.2 g) was added thereto for reduction and supporting. A mixed solution thus obtained was washed by filtration, and a powder thus obtained was dried to obtain a platinum-supporting catalyst. Next, the amount of oxygen on the surface of the platinum-supporting catalyst was decreased to 4% by weight or less. Then, cobalt (0.03 g) was supported on the carbon support so that the product ratio (molar ratio) of Pt to Co was 7:1, thereby obtaining a platinum cobalt-supporting catalyst.
(2) Alloying Step The obtained platinum cobalt-supporting catalyst was alloyed at 800° C. in an argon atmosphere, thereby obtaining an electrocatalyst containing the carbon support supporting catalyst alloy particles (i.e., a catalyst alloy particle-supporting carbon support).

The obtained electrocatalyst was observed by 3D-TEM to measure the following: the average effective diameter of the mesopore of the carbon support; the porosity (%) of the carbon support in a measured region; the porosity (%) per particle of the carbon support; the average effective diameter of the at least one throat of the mesopore of the carbon support; the total extension distance of the mesopore of the carbon support; the average distance between the bifurcation points of the mesopore of the carbon support; the percentage of the carbon support surface on which the catalyst alloy was supported, relative to the whole carbon support surface (hereinafter, it may be referred to as "supporting percentage"); and the average distance between the entrance of the mesopore of the carbon support and the catalyst alloy (hereinafter, it may be referred to as "average supporting position distance"). The measurement results are shown in Table 1.

Example 2 and Comparative Examples 1 and 2

The electrocatalysts of Example 2, Comparative Example 1 and Comparative Example 2 were obtained in the same manner as Example 1, except for using carbon supports which are, as shown in Table 1, different from the carbon support of Example 1 in the following items: the average effective diameter of the mesopore of the carbon support, the porosity (%) of the carbon support in the measured region, the porosity (%) per particle of the carbon support, the average effective diameter of the at least one throat of the mesopore of the carbon support, and the average distance between the bifurcation points of the mesopore of the carbon support.

The obtained electrocatalysts of Example 2 and Comparative Examples 1 and 2 were observed by 3D-TEM in the same manner as Example 1. The results are shown in Table 1.

The electrocatalyst obtained in Example 2 was analyzed by transmission electron microscopy-energy dispersive X-ray spectrometry (TEM-EDX). The cobalt concentration of the catalyst alloy supported between the carbon support surface and the part more inside (deeper side) than the at least one throat of the mesopore of the carbon support, was measured.

Figure 2:
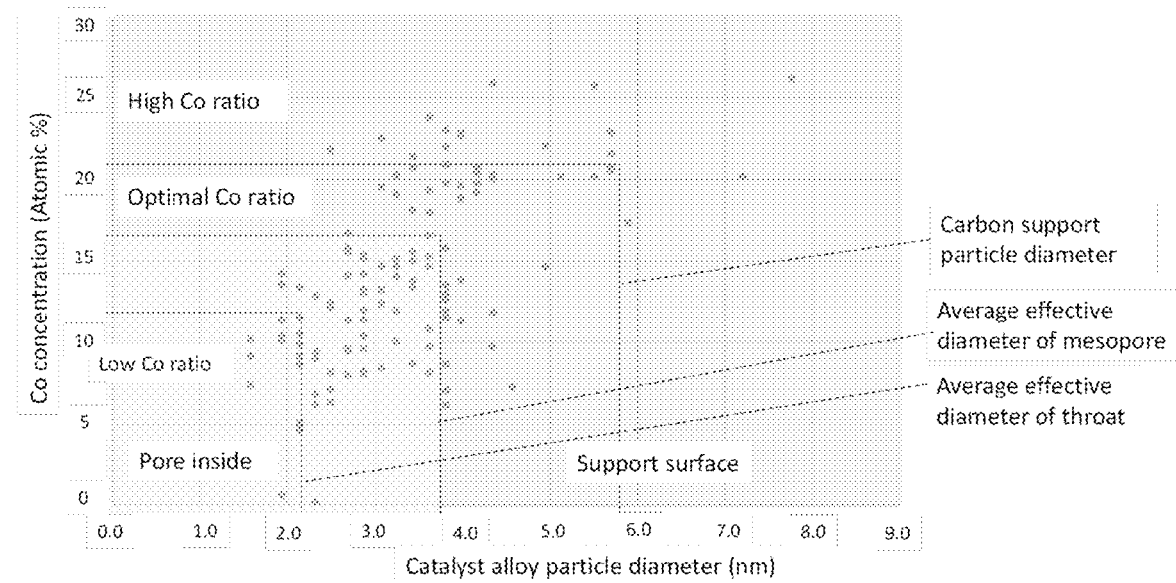
FIG. 2 is a view showing the relationship between catalyst alloy particle diameter and cobalt concentration.

FIG. 2 is a view showing the relationship between the catalyst alloy particle diameter and the cobalt concentration.

In the electrocatalyst obtained in Example 2, the catalyst alloy particles having a particle diameter which is equal to or more than the average effective diameter (3.8 nm in Example 2) of the mesopore of the carbon support, are largely supported outside the mesopore or on the carbon support surface. The catalyst alloy particles having a particle diameter which is equal to or more than the average effective diameter of the at least one throat of the mesopore of the carbon support (2.1 nm in Example 2) and which is less than the average effective diameter of the mesopore, are largely supported on the region more outside (nearer side) than the at least one throat of the mesopore. The catalyst alloy particles having a particle diameter which is less than the average effective diameter of the at least one throat of the mesopore of the carbon support, are largely supported on the region more inside (deeper side) than the at least one throat of the mesopore.

As shown in FIG. 2, the cobalt concentration of the catalyst alloy particles entering the region more inside (deeper side) than the at least one throat of the mesopore is low, and the cobalt concentration of the catalyst alloy particles present on the region more outside (nearer side) of the at least one throat of the mesopore is high. Accordingly, it was demonstrated that a difference in the transition metal ratio of the catalyst alloy particles supported on the carbon support, can be made between the region more inside than the at least one throat of the mesopore and the region more outside than the at least one throat of the mesopore.

TABLE 1

| | Pore | | | Throat | Path | | Supporting | Average |
| --- | --- | --- | --- | --- | --- | --- | --- | --- |
| | Average | | | Average | | | | |
| Sample | effective diameter (nm) of mesopore | Porosity (%) in measured area | Porosity (%) per particle | effective diameter (nm) of throat | Total extension distance (nm) | Average distance (nm) | percentage Support surface (%) | supporting position distance (nm) |
| Comparative Example 1 | 4.6 | 72 | 52 | 3.5 | 3867 | 7.3 | 22.5 | 17.1 |
| Comparative Example 2 | 4.7 | 43 | 47 | 3.2 | 3894 | 6.2 | 22.5 | 16.0 |
| Example 1 | 3.2 | 39 | 47 | 1.8 | 5060 | 3.8 | 22.8 | 10.8 |
| Example 2 | 3.8 | 33 | 41 | 2.1 | 3112 | 4.7 | 26.0 | 14.3 |

<Production of Unit Fuel Cells>

The electrocatalyst obtained in Example 2 was dispersed in an organic solvent. A dispersion thus obtained was applied to a Teflon (trade name) sheet to form an electrode. A total of two electrodes were formed, and an electrolyte membrane was sandwiched by the two electrodes. They were attached by hot pressing to obtain a membrane electrode assembly. The membrane electrode assembly was sandwiched by two diffusion layers to obtain a unit fuel cell. Using the electrocatalysts obtained in Comparative Examples 1 and 2, unit fuel cells were obtained in the same manner.

<Evaluation of Unit Fuel Cells>

The temperature of each of the unit fuel cells obtained in Example 2 and Comparative Examples 1 and 2 was set to 60° C., and the relative humidity of the two electrodes of each unit fuel cell was set to 80%. IV measurement of each unit fuel cell was carried out by use of a small unit fuel cell evaluation system (manufactured by Toyo Corporation).

In the IV measurement, current was controlled in a range of from 0.01 A/cm$^2$ to 4.0 A/cm$^2$. The current value at 0.2 A/cm$^2$ was defined as active.

<Durability Test of Unit Fuel Cells>

The durability of the unit fuel cells obtained in Example 2 and Comparative Examples 1 and 2 was tested in the following condition.

In the durability test, 60000 potential cycles between 0.6 V to 0.9 V in a square wave pattern, were applied.

Figure 3:
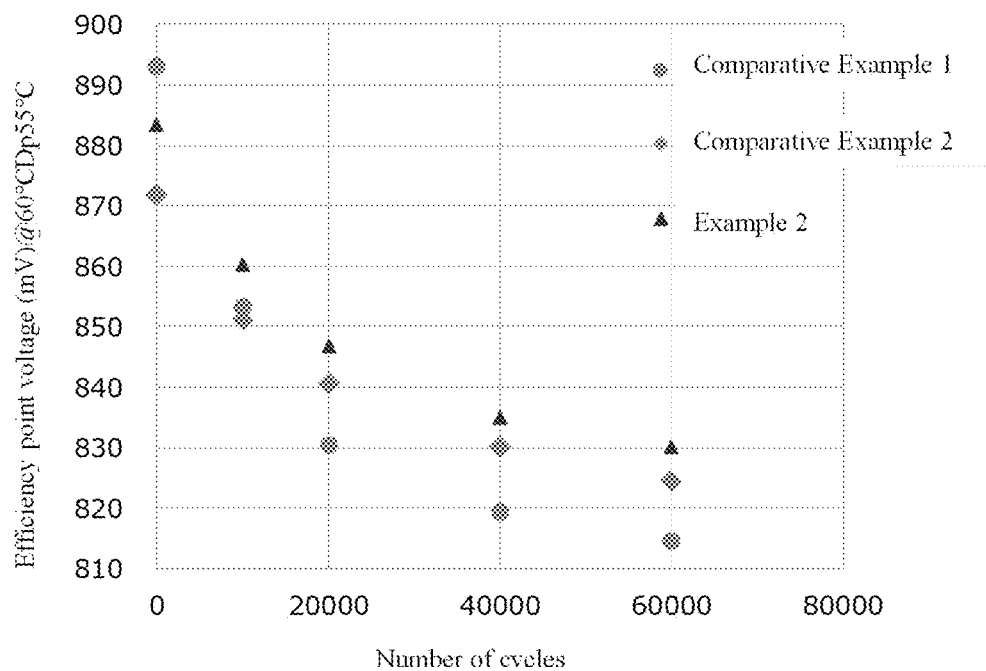
FIG. 3 is a view showing the relationship between the number of cycles in the test of a unit fuel cell and the efficiency point voltage of the unit fuel cell at a temperature of 60° C. and a dew point temperature (Dp) of 55° C.

FIG. 3 is a view showing the relationship between the number of cycles in the test of the unit fuel cell and the efficiency point voltage of the unit fuel cell at a temperature of 60° C. and a dew point temperature (Dp) of 55° C.

As shown in FIG. 3, for Comparative Example 1, the initial activity is high; however, the activity largely decreases after the durability test.

For Comparative Example 2, the initial activity is low; however, the capacity retention rate after the durability test is high.

For Example 2, the initial activity is kept higher than Comparative Example 2, and the performance is the highest after the durability test.

Accordingly, it was demonstrated that the fuel cell using the electrocatalyst of the disclosed embodiments is well-balanced between initial performance and durability performance. Under "Examples", the cases in which cobalt was used as the transition metal, were described. Nickel and cobalt are neighbors in the periodic table, and they have similar metallic properties. Accordingly, even in the case of using nickel as the transition metal, it is estimated that the same effects as the case of using cobalt are obtained.

The invention claimed is:

1. An electrocatalyst for fuel cells,
    wherein the electrocatalyst comprises a carbon support including a mesopore and a catalyst alloy supported on the carbon support, and the catalyst alloy is a catalyst alloy of platinum and a transition metal;
    wherein the mesopore includes at least one throat;
    wherein an average effective diameter of the at least one throat is 1.8 nm or more and less than 3.2 nm; and
    wherein a transition metal ratio of the catalyst alloy supported on a deeper-side region than the at least one throat, is lower than the transition metal ratio of the catalyst alloy supported on a nearer-side region than the at least one throat.

2. The electrocatalyst according to claim 1, wherein an average effective diameter of the mesopore is 3.2 nm or more and 3.8 nm or less.

3. The electrocatalyst according to claim 1, wherein the average effective diameter of the at least one throat is 1.8 nm or more and 2.1 nm or less.

4. The electrocatalyst according to claim 1, wherein the transition metal is at least one selected from the group consisting of cobalt and nickel.

5. A fuel cell comprising a catalyst layer comprising the electrocatalyst defined by claim 1.

* * * * *